US010830622B2

(12) United States Patent
Jobst

(10) Patent No.: US 10,830,622 B2
(45) Date of Patent: Nov. 10, 2020

(54) METHOD FOR DETERMINING A FLOW RATE AND/OR A FLOW VELOCITY OF A MEDIUM

(71) Applicant: Jobst Technologies GmbH, Freiburg (DE)

(72) Inventor: Gerhard Jobst, Freiburg (DE)

(73) Assignee: JOBST TECHNOLOGIES GMBH, Freiburg (DE)

(*) Notice: Subject to any disclaimer, the term of this patent is extended or adjusted under 35 U.S.C. 154(b) by 239 days.

(21) Appl. No.: 16/061,048

(22) PCT Filed: Nov. 17, 2016

(86) PCT No.: PCT/EP2016/077966
§ 371 (c)(1),
(2) Date: Jul. 17, 2018

(87) PCT Pub. No.: WO2017/102235
PCT Pub. Date: Jun. 22, 2017

(65) Prior Publication Data
US 2018/0364082 A1    Dec. 20, 2018

(30) Foreign Application Priority Data

Dec. 15, 2015 (DE) .................. 10 2015 121 866

(51) Int. Cl.
*G01F 1/684* (2006.01)
*G01P 5/12* (2006.01)
(Continued)

(52) U.S. Cl.
CPC ............ *G01F 1/6845* (2013.01); *G01F 1/692* (2013.01); *G01F 1/6986* (2013.01); *G01P 5/12* (2013.01); *B01L 3/5027* (2013.01)

(58) Field of Classification Search
CPC ...... B01L 3/5027; G01F 1/6845; G01F 1/692; G01F 1/6986; G01P 5/12
See application file for complete search history.

(56) References Cited

U.S. PATENT DOCUMENTS 4,651,564 A    3/1987  Johnson et al.
5,555,152 A *  9/1996  Brauchle ............... H03F 1/523
                                                            361/103

(Continued)

FOREIGN PATENT DOCUMENTS

DE        36 37 497 A1      7/1987
DE    10 2011 081 923 A1    2/2013
(Continued)

OTHER PUBLICATIONS

German Search Report, German PTO, Munich, dated Jul. 11, 2016.
International Search Report, EPO, The Netherlands, dated Mar. 2, 2017.

*Primary Examiner* — Francis C Gray
(74) *Attorney, Agent, or Firm* — Bacon & Thomas, PLLC

(57) ABSTRACT

A method for determining a flow rate and/or a flow velocity of a medium interacting with at least a first and a second temperature sensor element and a heating element, wherein the method comprises the following method steps: heating the medium by means of the heating element for a predetermined heating duration, wherein the medium before the heating is largely in thermal equilibrium with at least the first and second temperature sensor elements; registering at least a first and a second measured value with the assistance of the first temperature sensor element and at least a third and a fourth measured value with the assistance of the second temperature sensor element for characterizing first and second temperature rises of the medium; and ascertaining the flow rate and/or flow velocity of the medium based on the at least two temperature rises.

15 Claims, 5 Drawing Sheets

(51) Int. Cl.
   *G01F 1/692*   (2006.01)
   *G01F 1/698*   (2006.01)
   *B01L 3/00*    (2006.01)

(56) References Cited

U.S. PATENT DOCUMENTS

| | | | | |
|---|---|---|---|---|
| 6,550,324 | B1 * | 4/2003 | Mayer | G01F 1/6986 |
| | | | | 73/204.14 |
| 6,763,710 | B2 * | 7/2004 | Mayer | G01F 1/6845 |
| | | | | 73/204.11 |
| 7,490,511 | B2 * | 2/2009 | Mayer | G01F 1/6845 |
| | | | | 73/204.15 |
| 7,500,392 | B1 * | 3/2009 | Plowman | G01F 1/6845 |
| | | | | 73/204.26 |
| 2002/0190839 | A1 | 12/2002 | Padmanabhan et al. | |
| 2014/0116128 | A1 | 5/2014 | Mantinband et al. | |
| 2018/0376537 | A1 * | 12/2018 | Zandbergen | H01J 37/26 |

FOREIGN PATENT DOCUMENTS

DE   10 2015 121 866 A1   6/2017
EP             1 094 306 A1   4/2001

* cited by examiner

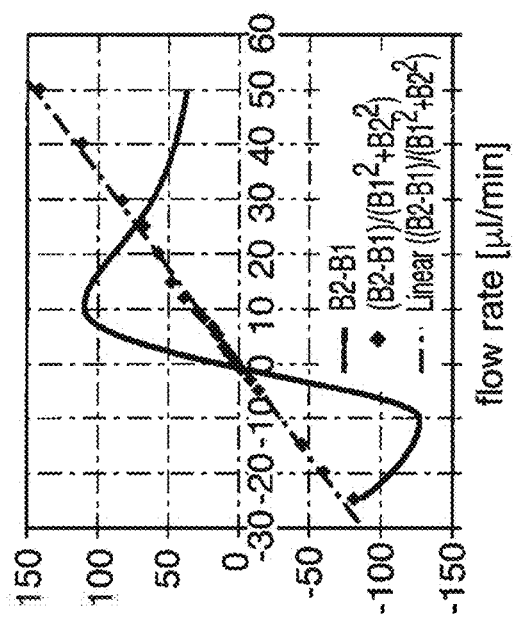
Fig. 3e
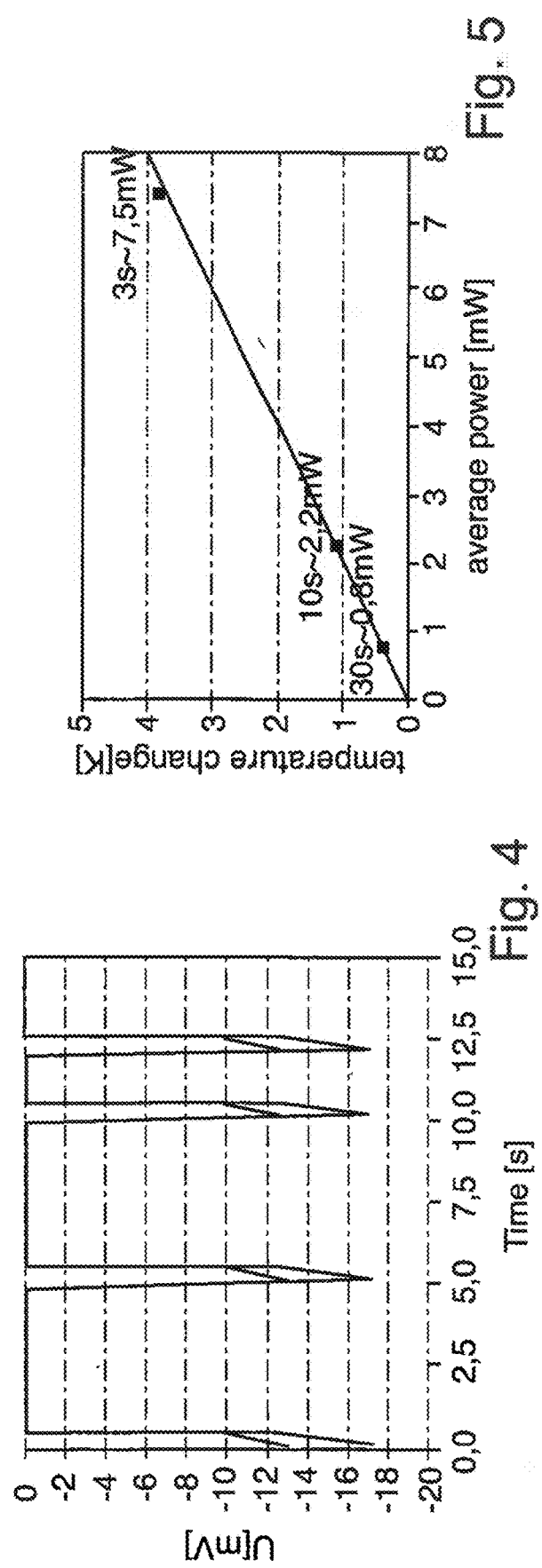
Fig. 5
Fig. 4

METHOD FOR DETERMINING A FLOW RATE AND/OR A FLOW VELOCITY OF A MEDIUM

TECHNICAL FIELD

The invention relates to a method as well as an apparatus for determining a flow rate and/or a flow velocity of a medium.

BACKGROUND DISCUSSION

Known for determining a flow rate and/or a flow velocity of a medium, e.g. a fluid, for example, a gas or gas mixture, are thermal flow sensors. These make use of the fact that a (flowing) medium transports heat. Such flow sensors utilize a known structural arrangement of at least one heating element and at least one temperature sensor element, in order to determine the flow rate or the flow velocity of the medium.

Calorimetric thermal flow sensors determine via a temperature difference between two temperature sensor elements, which are arranged on a substrate upstream and downstream from the heating element, the flow or flow rate of the fluid in a channel. Utilized for this is the fact that the temperature difference is, to a certain degree, linearly related to the flow velocity or flow rate. This method is amply described in the relevant literature.

Disadvantageous in the case of the calorimetric flow sensors known from the state of the art is that they bring about a continuous heat in-coupling into the medium during operation, so that the medium experiences a continuous heating.

SUMMARY OF THE INVENTION

It is, consequently, an object of the invention to provide an opportunity for reducing heat in-coupling into a medium.

The object is achieved by a method, by an apparatus for determining a flow rate and/or a flow velocity, by a catheter, as well as by a lab-on-a-chip system.

As regards the method, the object is achieved by a method for determining a flow rate and/or a flow velocity of a medium interacting with at least a first and a second temperature sensor element and a heating element, wherein the method comprises the following method steps:

heating the medium by means of the heating element for a predetermined heating duration, wherein the medium before the heating is largely in thermal equilibrium with at least the first and second temperature sensor elements;

registering at least a first and a second measured value with the assistance of the first temperature sensor element and at least a third and a fourth measured value with the assistance of the second temperature sensor element for characterizing first and second temperature rises of the medium; and ascertaining the flow rate and/or flow velocity of the medium based on the at least two temperature rises.

The terminology, thermal equilibrium, means here a state, wherein the medium is largely thermally equilibrated, so that the medium is almost at equal temperature with the first and/or second temperature sensor element.

The invention is based on the idea not to wait for temperature gradients to become largely stabilized, before registering a measured value. From the registered measured values, then the flow rate and/or flow velocity is determined.

In contrast to flow sensors known from the state of the art, the registering of measured values occurs within a short time after issuing a heating pulse to the heating element. The time is significantly less than a waiting time known for flow sensors from the state of the art.

In this way, the amount of heat input into the medium can be held to a minimum. The medium is thus less thermally burdened. In this way, especially the flow rate of heat sensitive media can be determined.

An advantageous form of embodiment of the method of the invention provides that the heating element, for heating the medium for a predetermined heating duration, is brought from a first state, especially a first voltage state, in which the heating element is located in thermal equilibrium, into a second state, especially a second voltage state, and wherein the heating element, after the predetermined heating duration, is returned to the first state. Because no continuous heating of the medium by the heating element takes place, such as already mentioned, the heat input into the medium can be reduced. The form of embodiment, can, furthermore, provide that the first state has a voltage value differing from zero. In the case, in which a voltage value different from zero is used, it is also possible over a long period of time between two heating cycles following one after the other to conduct an evaluation of the flow rate with significantly lesser accuracy than during the heating cycles.

Another advantageous form of embodiment of the method of the invention provides that at least the registering of the second and fourth measured value, preferably all additional measured values, occurs while the temperature of the pertinent temperature sensor element is still rising.

An advantageous form of embodiment of the method of the invention provides that a duration of less than 2 seconds, preferably less than 1 second, is used as predetermined heating duration.

Another advantageous form of embodiment of the method of the invention provides that the measured values are registered within the predetermined heating duration.

Another advantageous form of embodiment of the method of the invention provides that the method steps, especially the heating of the medium, are performed recurringly, especially cyclically or aperiodically. Especially, the form of embodiment provides that a time interval between two heatings of the medium following one after the other is so selected that, within the time interval, thermal equilibrium between at least the first and second temperature sensor elements and the medium essentially returns. The recurring performance of the method offers the advantage that the method also can be performed by sensors, whose heating structure, or heating structures, would not withstand a lasting load because of the heating.

Another advantageous form of embodiment of the method of the invention provides that, for characterizing the two temperature rises, for the registered first temperature rise a first constant and a first slope value are ascertained and for the second temperature rise a second constant and a second slope value are ascertained, wherein via the two constants, in each case, ohmic resistance values for the particular temperature sensor elements in thermal equilibrium are ascertained and via the two slope values, in each case, temperature increases for the particular temperature sensor elements are ascertained, wherein preferably the determining of constants and slope values is performed after a transforming of the time values for linearizing the temperature rises.

Another advantageous form of embodiment of the method of the invention provides that at least one of the following steps is performed for ascertaining the flow rate and/or flow velocity of the medium:

determining, in each case, a thermal power output to the first, and the second, temperature sensor element through the medium, normalizing the two temperature increases, especially by dividing the temperature increase by the output thermal power and forming a difference between the two normalized temperature increases, linearizing a difference between the two normalized temperature increases by dividing by a function that contains the normalized temperature increases, ascertaining the flow rate and/or flow velocity by multiplying the linearized difference between the two normalized temperature increases by a calibration factor, and correcting the ascertained flow rate or flow velocity via a lookup-table.

Another advantageous form of embodiment of the method of the invention provides that the heating element is operated with a duty cycle of no greater than 10%, preferably no greater than 5%, in order to limit thermal power input to the medium.

Another advantageous form of embodiment of the method of the invention provides that the average thermal power input into the medium is no greater than 2 mW, especially no greater than 1 mW.

Another advantageous form of embodiment of the method of the invention provides that the medium comprises a biological medium, for example, a nutrient or blood.

As regards the apparatus, the object is achieved by an apparatus for determining a flow rate and/or a flow velocity of a medium, comprising a structure and a computing unit, wherein the structure is in thermal interaction with the medium and includes at least a first temperature sensor element, a second temperature sensor element and a heating element, wherein the computing unit is embodied to perform the method according to at least one of the above described forms of the method.

An advantageous embodiment of the apparatus provides that the heating element is integrated in at least one of the two temperature sensor elements.

An alternative embodiment of the apparatus provides that the heating element is embodied separately from the first and the second temperature sensor elements and is arranged between the two temperature sensor elements.

Another advantageous embodiment of the apparatus provides that the structure, which includes the first and the second temperature sensor elements and the heating element, is embodied on a substrate and has an area of less than one square millimeter.

Another advantageous embodiment of the apparatus provides that the structure comprises a micro structured, electrically conductive layer and the first temperature sensor element comprises a first ohmic resistor and the second temperature sensor element a second ohmic resistor, wherein the resistors have a tolerance value of up to 10%, especially up to 20%, wherein resistance values of the resistors can differ from one another by the tolerance value.

The method of the invention enables determining a flow rate and/or a flow velocity with apparatuses, whose resistance values differ by up to 20%. Thus, the manufacturing step of laser trimming performed supplementally in the case of apparatuses known from the state of the art can be omitted.

As regards the catheter, the object is achieved by a catheter, which has at least one apparatus according to one of the above described embodiments.

As regards the lab-on-a-chip system, the object is achieved by a lab-on-a-chip system, which has at least one apparatus according to one of the above described embodiments. Such lab-on-a-chip systems can have, furthermore, other means or functions in addition to the apparatus of the invention. For example, they can include chemical- and/or biosensors, and physical sensors, for sample preparation, as well as amplification systems such as PCR, chambers for cultivating cells and microorganisms and/or microfluidic means, etc.

BRIEF DESCRIPTION OF THE DRAWINGS

The invention will now be explained in greater detail based on the appended drawing, the figures of which show as follows:

FIG. 2a is a first example of an embodiment of an electrical circuit for performing the method of the invention by means of the first structure illustrated in FIG. 1a;

FIG. 2b is a second example of an embodiment of an electrical circuit for performing the method of the invention by means of the first structure illustrated in FIG. 1a;

FIG. 2c is a third example of an embodiment of an electrical circuit for performing the method of the invention by means of the first structure illustrated in FIG. 1a;

FIGS. 3b, and 3c are graphs of transformed measurement curves of FIG. 3a;

FIG. 3e is a flow rate ascertained from the expression of dimension K/W;

FIG. 4 is a graph of repeated performing of measuring;

FIG. 5 shows modulation of average power output by changing the predetermined heating duration.

DETAILED DISCUSSION IN CONJUNCTION WITH THE DRAWINGS

Figure 1A:
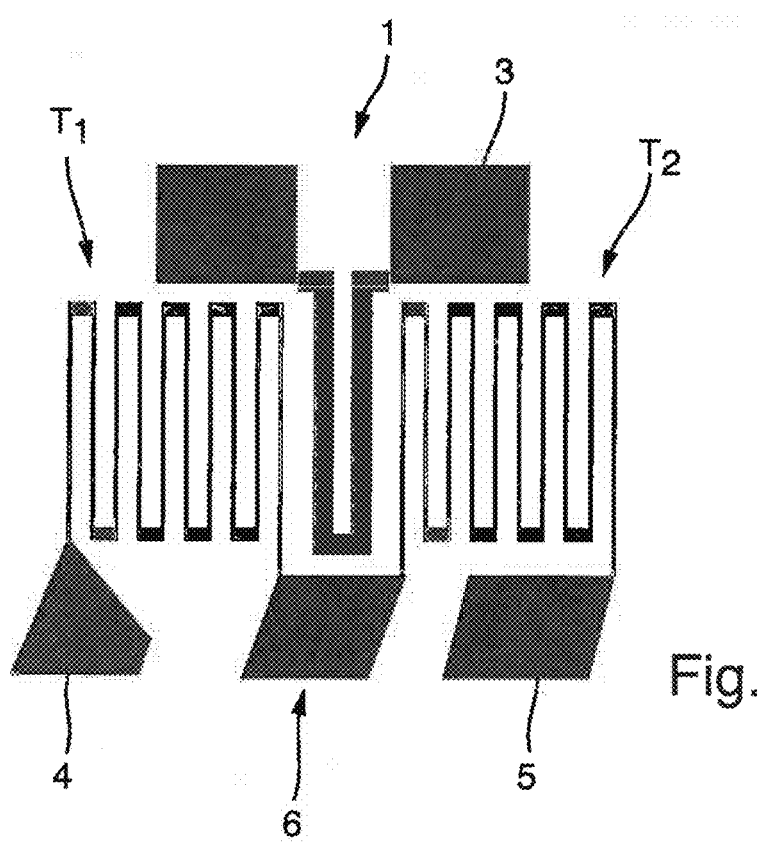
FIG. 1a by way of example, is a first structure, which can be used in an apparatus of the invention for performing the method of the invention.
Figure 1B:
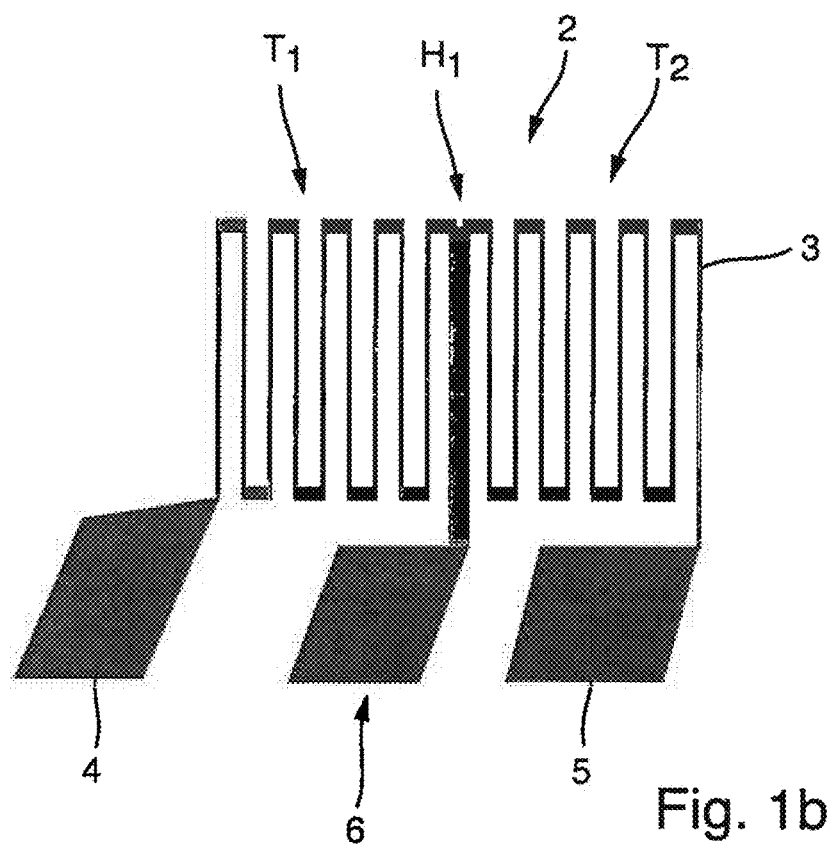
FIG. 1b by way of example, is an alternative, second structure, which likewise can be used in an apparatus of the invention for performing the method of the invention.

FIG. 1a shows a first structure 1, which can be used with the method of the invention. In FIGS. 1a and 1b, the black areas represent electrically conductive layers 3, which are manufacturable on a substrate 14 by means of established methods of microstructure technology. Conventional methods can be, for example, thin film- or thick film methods. The substrate 14 can comprise, for example, silicon or, advantageously, aluminum oxide or polyimide.

The first structure 1 includes a first temperature sensor element $T_1$, a second temperature sensor element $T_2$ and a heating element $H_1$. The first temperature sensor element $T_1$ is operable via a first measuring contact 4 and a shared ground contact 6. The second temperature sensor element $T_2$ is operable via a second measuring contact 5 and the shared ground contact 6. The two temperature sensor elements $T_1$ and $T_2$ are thus connected via the first and second measuring contacts 4, 5 and a shared ground contact 6. The heating element $H_1$ is connectable via a first supply line 21 and a second supply line 22.

FIG. 1*b* shows, by way of example, an alternative, second structure 2, which likewise can be used for performing the method of the invention.

The second structure 2 includes likewise a first and a second temperature sensor element $T_1$, $T_2$, which are connectable, again, via first and second measuring contacts 4, 5 as well as a shared ground contact 6.

The heating element $H_1$ of the second structure 2 is, in contrast to that of the first structure 1, not separately embodied, but, instead, is formed by the second temperature sensor element $T_2$, which thus functions both as temperature sensor element and also as heating element. The heating element $H_1$ is energized by the second measuring contact 5, which thus also serves as supply line, and the shared ground contact 6. Other options include naturally also a variant, in the case of which the heating element $H_1$ is formed by the first temperature sensor element $T_1$.

Preferably, both the first structure 1 as well as also the second structure 2 are produced by a single micromechanical manufacturing step. In general, it is, however, not important for the invention, whether the structures are produced in a single manufacturing step or from a plurality of steps, or, by other manufacturing methods.

FIGS. 2*a* to 2*d* show examples of embodiments of options for electrical circuits for performing the method of the invention. In all examples of embodiments, $V_1$ and $V_2$ represent two measurement points. The electrical voltage is read at the measurement points for registering the measured values during the measurement procedure.

Figure 2B:
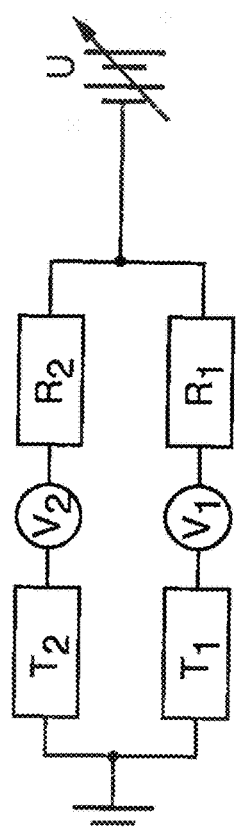
Figure 2D:
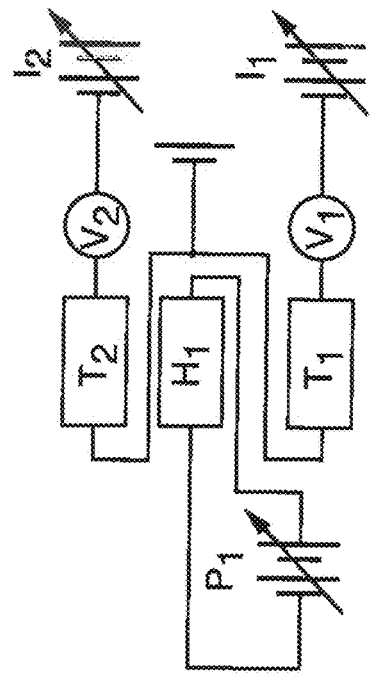
FIG. 2d is a fourth example of an embodiment of an electrical circuit for performing the method of the invention by means of the second structure illustrated in FIG. 1b.
Figure 2A:
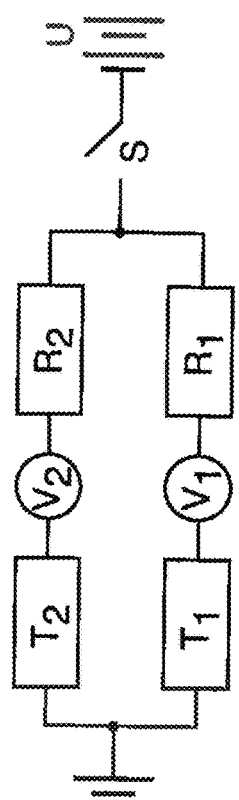

In detail, FIG. 2*a* shows a first example of an embodiment of an electrical circuit for performing the method of the invention by means of one of the two structures 1 and 2 illustrated above. The two temperature sensor elements $T_1$ and $T_2$ are, in such case, connected via a voltage source U and a switch S, in each case, in series with an electrical resistor, so that a bridge circuit results. Typically, the two values of the resistors $R_1$ and $R_2$ are essentially equal.

FIG. 2*b* shows a second example of an embodiment of an electrical circuit for performing the method of the invention by means of one of the above illustrated structures 1 and 2. In such case, the second differs from the first example of an embodiment by the feature that the function of switch S for changing the heating voltage is replaced with a controllable voltage source.

Figure 2C:
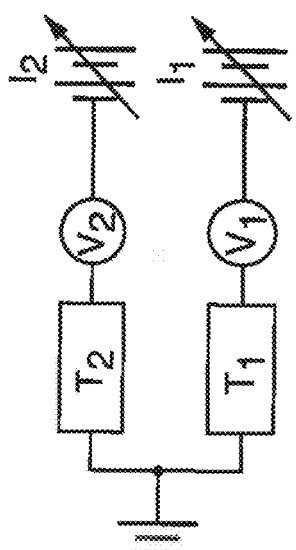

FIG. 2*c* shows a third example of an embodiment of an electrical circuit for performing the method of the invention by means of one of the above illustrated structures 1 and 2. In such case, the function of voltage divider in the form of the two resistors, such as shown in FIGS. 2*a* and 2*b*, is replaced with a first and a second controllable electrical current source $I_1$ and $I_2$.

FIG. 2*d* shows a fourth example of an embodiment of an electrical circuit for performing the method of the invention by means of the second structure 2. A controllable electrical power source P1 heats the heating element $H_1$, which according to the second structure 2 is formed either by the first or the second temperature sensor element $T_1$, $T_2$. The two electrical current sources $I_1$ and $I_2$ output only a very small electrical current, for example, 10 μA, to the two temperature sensor elements $T_1$ and $T_2$, so that these only insignificantly heat. In this way, it is assured that the principal emission of heat occurs at the heating element.

Figure 3A:
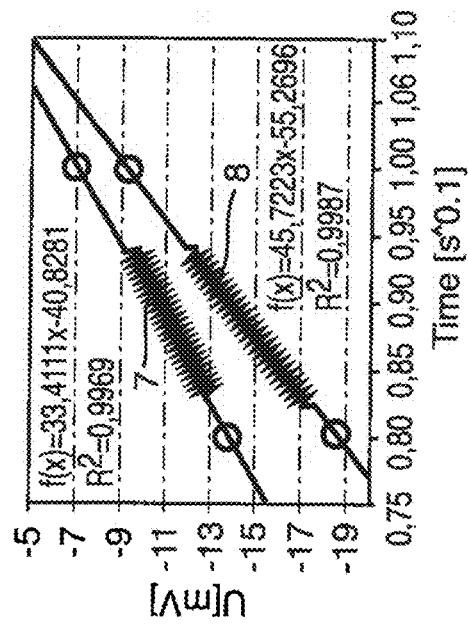
FIG. 3a is a graph of measurement curves according to the method of the invention.

FIG. 3*a* shows a graph of a real measurement curve according to the method of the invention. The measuring was done with an apparatus of the invention for determining flow rate and/or flow velocity. Thus, a medium was heated, which prior to heating was in thermal equilibrium with the two heating- and/or temperature sensor elements. Plotted on the ordinate is the voltage and on the abscissa the time. Shown are two temperature rises 7 and 8, which result from the measured values 9, 10, 11, 12 registered at the two measurement points $V_1$ and $V_2$. The upper voltage curve corresponds to the first temperature rise 7 and the lower curve to the second temperature rise 8. The first temperature rise was 7, in such case, registered via a plurality of measured values. In principle, however, per temperature rise, only a first and a second, or a third and a fourth, measured value are necessary.

Evident from the measurement curve, is that such systems, after a time greater than a second, are still significantly removed from a next thermal equilibrium, which would form between the heated medium and the two heating- and/or temperature sensor elements after a relaxation time.

For this reason, in the case of the method known from the state of the art, typically there is a wait time of at least 30 seconds, before measured values are evaluated for determining the flow rate and/or flow velocity.

In contrast to this, according to the method of the invention, the measured values are evaluated in the first seconds, preferably in the first two seconds, especially preferably within the first second, after a heating of the medium by the heating element $H_1$ occurs. Thus in the case of the invention, an evaluation of the two registered temperature rises 7, 8 takes place. In contrast to this, in the case of the method known from the state of the art, the development of the next thermal equilibrium between the two temperature sensor elements $T_1$, $T_2$ and the heated medium 18 is waited for. The development of such a next thermal equilibrium takes typically at least 30 seconds. In the present case, the measurement duration amounted to 0.5 seconds. This is shown, by way of example, via a black vertical line.

Due to the fact that the evaluation occurs before the forming of thermal equilibrium, the method of the invention can be performed with a short heating duration, for example, a heating pulse, which is applied at the heating element $H_1$. The duration and/or intensity of the heating pulses can, in such case, be matched and/or varied corresponding to the apparatus of the invention. Advantageously, the predetermined heating duration is less than 2 seconds, especially advantageously less than 1 second. Due to the short heating duration, thus also heating elements, or structures of heating elements, can be used, which would not withstand a lasting load in the form of a continuously applied heating voltage. Thus, the method of the invention can also be applied with apparatuses known from the state of the art.

Figure 3B:
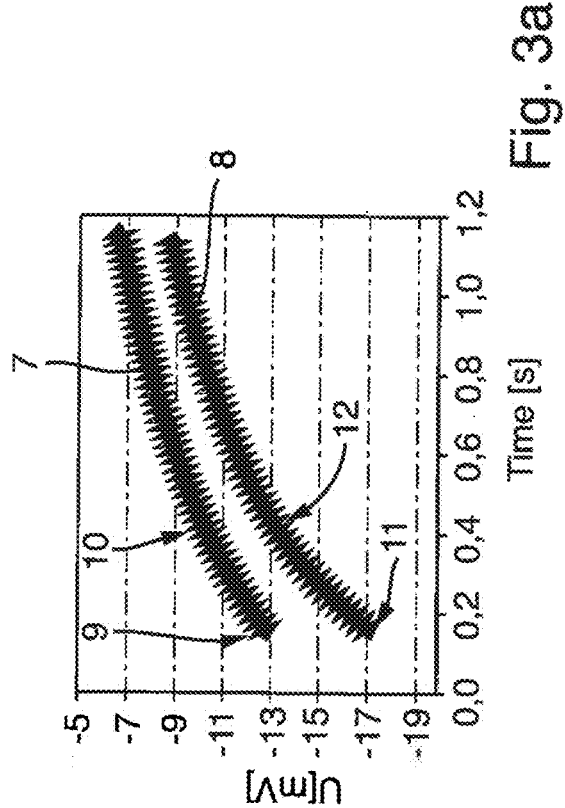

FIG. 3*b* shows a transformed real measurement curve of FIG. 3*a*. The measurement curves illustrated in FIG. 3*b* were reached by means of regression according to the following Equation 1:

$$U_n = a_n + b_n * t^k \qquad \text{(Equation 1)}$$

with n=1, 2 for the corresponding temperature sensor element, k=0.1 for the present example.

In such case, Equation 1 represents a preferred form of an approximation function. However, also other approximation functions can be used.

Figure 3C:
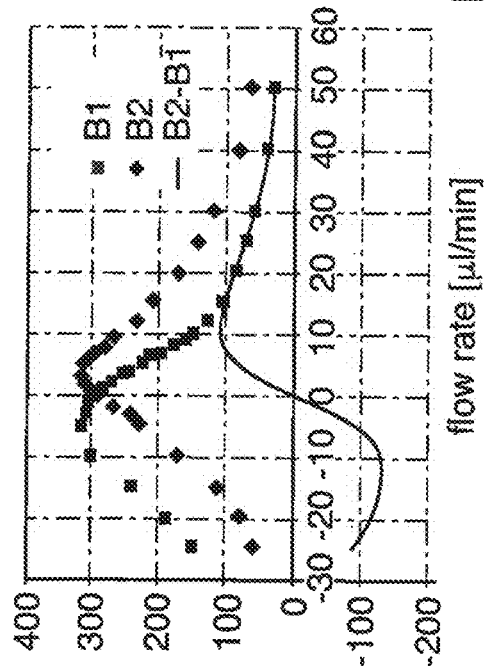

FIG. 3c shows only the measured values of the respective temperature sensor elements registered for the measurement duration of 0.5 seconds. The black circles mark the points in time 0.1 and 1 second. The difference "$B_n$" between the function values of the regression is used in the following described method and calculated according to Equation 2 as a change between two arbitrarily selected points in time. This procedure permits e.g. the factor k of the approximation function to change dynamically during operation (in order to obtain an improved approximation) without influencing the result $B_n$.

$$B_n = a_n + b_n * t^k - a_n + b_n * t^k = b_n * (1 - 0.1^k) \quad \text{(Equation 2)}$$

It is to be noted here that the preliminary result is ascertained not only, such as known from the state of the art, from an individual parameter in the form of the voltage difference between $V_1$ and $V_2$ for the particular temperature sensor element, but, instead, from four parameters in the form of measured values 9, 10, 11, 12. Thus, the method of the invention differs, as compared with the method known from the state of the art, also based on the number of parameters taken into consideration in the calculation for ascertaining the flow rate and/or flow velocity.

The parameters $a_n$ are determined for calculating the absolute resistance value of the two temperature sensor elements $T_1$ and $T_2$ according to the following Equation 3.

$$T_n[ohm] = R_n * (U - 2*a_n)/(U + 2*a_n) \quad \text{(Equation 3)}$$

wherein
$R_n$ = resistance value of the appropriate one of the two resistors $R_1$ and $R_2$
The units of $T_n$ is ohm.
The calculation of the value of the resistance increase occurs analogously according to Equation 4.

$$\Delta T_n[ohm] = R_n * (U - 2*a_n - B_n)/(U + 2*a_n + B_n) \quad \text{(Equation 4)}$$

This can be expressed with the assistance of the thermal coefficient of resistivity, TCR, also according to Equation 5 as a change of the temperature at the two temperature sensor elements $T_1$, $T_2$.

$$\Delta T[K] = TCR * \Delta R/R \quad \text{(Equation 5)}$$

wherein
TCR = thermal coefficient of resistivity
Calculating further the thermal power issued to the two temperature sensor elements $T_1$ and $T_2$ making use of Ohm's law, the quotient of temperature increase and power yields an expression of dimension, Kelvin over watt (K/W) as a normalized temperature increase. Alternatively, also the reciprocal value of the expression can thus be used as an expression of dimension watt over Kelvin (W/K).

Figure 3D:
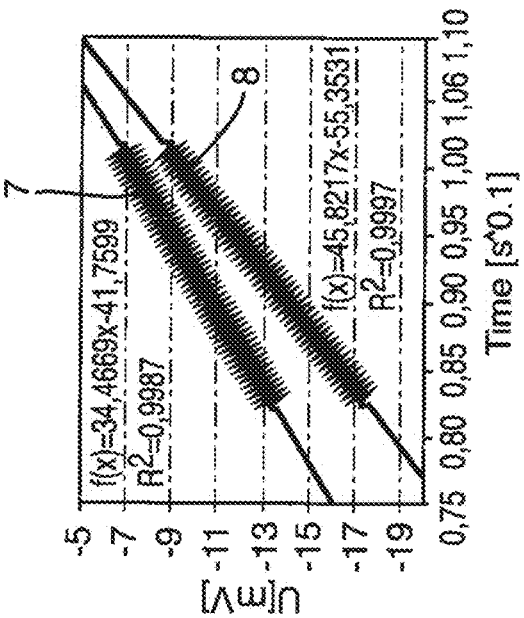
FIG. 3d is by way of example, a curve of an expression of dimension K/W.

FIG. 3d shows, by way of example, values of the expression of dimension K/W for the two temperature sensor elements $T_1$ and $T_2$. The expression describes the hindering of heat removal, which is essentially determined also by the convective cooling provided by the flow of the medium 18. As a result of the successive normalizations, this expression is essentially independent of the ratio of the absolute resistance values of the two temperature sensor elements $T_1$ and $T_2$ as well as their, in given cases, changeability as a function of time.

The values of the expression of dimension K/W illustrated in FIG. 3d are plotted in arbitrary units versus different flow rates. The continuous line represents, in such case, the difference between the two normalized temperature increases.

It can be seen from FIG. 3d that, outside of the value range between about −5 . . . +5 µl/min, the cooling by the flow limits the temperature rise, reduces the difference between the two values for the two temperature sensor elements $T_1$ and $T_2$ and therewith even leads to ambiguity.

Known from the state of the art is to use a constant over-temperature, in order to expand the usable measuring range beyond such limits. For example, an additional electronic control loop can be provided for this, i.e. an additional electronic control loop embodied to establish a constant over-temperature at a further temperature sensor element.

In contrast therewith, the method of the invention enables in advantageous manner a linearizing of the difference the two normalized temperature increases illustrated in FIG. 3d according to the following Equation 6, so that the ambiguity is eliminated. In this way, a flow rate is ascertainable without an additional electronic control loop being required.

$$\text{flow rate} = \text{calibration factor} * (B_2 - B_1)/(B_1^m + B_2^m) \quad \text{(Equation 6)}$$

with
m = preferably to 1.5 . . . 4.5.
FIG. 3e shows the result of such a linearizing.

The method of the invention offers, in addition to the elimination of the ambiguity, the advantage that an algorithmic matching of the heating power to the heat removal can be performed, in order to achieve a desired over-temperature. This offers the advantage that even at high flow rates, where the convective cooling largely prevents the temperature rise, a desired size of signal change is achievable. The expression of dimension K/W shown in FIG. 3d remains unaffected thereby, only the signal to noise ratio becomes more uniform.

Furthermore, it is advantageous that the flow rate calculated with the experimentally ascertained calibration factor be still further linearized by means of a lookup table. Affecting the calibration factor are, in such case, diverse parameters, which are dependent on the utilized apparatus. Examples of such parameters include substrate material parameters, size, structure and/or separation of the heating element from the temperature sensor elements.

FIG. 4 shows a graph of the repeated performing of a measuring. For this, the above described method steps are executed anew after a predetermined time interval, or period. Evident from FIG. 4 is the fact that the method of the invention, or its method steps, can be repeated in random time intervals. Thus, the time interval can be selected to be longer or shorter, in order to match the method to specific conditions. For example, the time interval can be selected shorter, in order to increase the accuracy of measurement by forming a moving average value. The time interval can, however, also be selected longer, in order, for example, to minimize, or reduce, the energy consumption and/or heat input into the medium 18. The choice of the "right" time interval depends thus, such as already mentioned, on the external conditions, for example, the environment, in which the method of the invention is being used. Thus, the choice of a longer time interval, for example, of 30 seconds, is advantageous especially in the field of bioanalysis. Using a longer time interval, the thermal power emitted to the medium can be reduced, in order not to destroy the, most often, temperature sensitive analytes.

FIG. 5 shows changing the average output of power by changing the predetermined time interval. Selected for this were the time intervals, 3 seconds, 10 seconds and 30 seconds. For registering the two temperature rises, the measured values were taken by means of the first, or second, temperature sensor element for a measurement duration of 1.15 seconds. The thermal power during the measuring amounted, in each case, to 19.5 mW. From this there results an average thermal power input into the medium of about 0.8 watt in the case of a time interval of 30 seconds, an average thermal power of about 2.2 watt in the case of a time interval of 10 seconds and an average thermal power of about 7.5 watt in the case of a time interval of 3 seconds, using a measurement duration, in each case, of 1.15 seconds.

Figure 6:
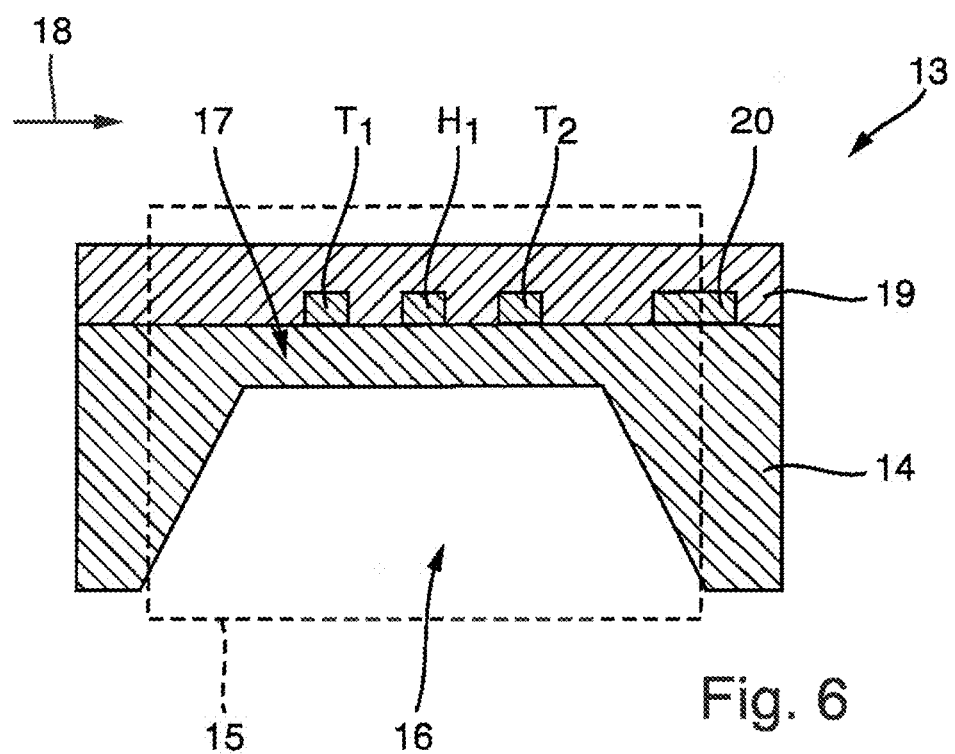
FIG. 6 is a cross section through an embodiment of an apparatus of the invention.

FIG. 6 shows a cross section through an embodiment of the apparatus 13 of the invention in the form of a sensor chip for determining a flow rate and/or a flow velocity. In such case, the apparatus 13 includes a substrate 14, which optionally in a first region 15 includes a cavity 16, so that a membrane 17 is formed. Heating element $H_1$ is mounted on the membrane 17 in such a manner that it is located between the first and second temperature sensor elements $T_1$ and $T_2$ in the flow direction of the medium 18 and serves to heat the medium 18. The two temperature sensor elements $T_1$ and $T_2$ are likewise mounted on the membrane 17 and preferably arranged in such a manner that they lie in the first region 15. By means of these two temperature sensor elements $T_1$ and $T_2$, the temperature of the medium 18 heated at the heating element $H_1$ is registered. For protection of the heating element $H_1$ and the two temperature sensor elements $T_1$ and $T_2$, preferably a dielectric layer 19 is applied for protection of the elements.

The apparatus includes, furthermore, a control unit 20, which is embodied to execute the above described method. For this, the control unit includes especially at least one of the circuits illustrated in FIG. 2, means for controlling the switch S, means for measuring the measurement points $V_1$ and/or $V_2$, means for setting the electrical current $I_1$, or $I_2$, and means for calculating the flow rate.

FIG. 6 shows the control unit as part of the sensor chip. Alternatively, the control unit can also be embodied separately from the sensor chip.

The invention claimed is:

1. A method for determining a flow rate and/or a flow velocity of a medium interacting with at least a first and a second temperature sensor element and a heating element the method comprises the following method steps:
heating the medium by means of the heating element for a predetermined heating duration, wherein the medium before the heating is largely in thermal equilibrium with at least the first and second temperature sensor elements;
registering at least a first and a second measured value with the assistance of the first temperature sensor element and at least a third and a fourth measured value with the assistance of the second temperature sensor element for characterizing first and second temperature rises of the medium; and
ascertaining the flow rate and/or flow velocity of the medium based on the at least two temperature rises;
wherein:
for characterizing the two temperature rises, for the registered first temperature rise a first constant and a first slope value are ascertained and for the second temperature rise a second constant and a second slope value are ascertained;
via the two constants, in each case, ohmic resistance values for the particular temperature sensor elements in thermal equilibrium are ascertained and via the two slope values, in each case, temperature increases for the particular temperature sensor elements are ascertained; and
the determining of constants and slope values is performed after a transforming of the time values for linearizing the temperature rises.

2. The method as claimed in claim 1, wherein:
the heating element, for heating the medium for a predetermined heating duration, is brought from a first voltage state, in which the heating element is located in thermal equilibrium, into a second voltage state; and
the heating element, after the predetermined heating duration, is returned to the first state.

3. The method as claimed in claim 1, wherein:
said registering of the second and fourth measured values, and all additional measured values, occurs while the temperature of the pertinent temperature sensor element is still rising.

4. The method as claimed in claim 1, wherein:
a duration of less than 2 seconds, preferably less than 1 second, is used as a predetermined heating duration.

5. The method as claimed in claim 1, wherein:
the measured values are registered within the predetermined heating duration.

6. The method as claimed in claim 1, wherein:
the method steps, especially the heating of the medium, are performed cyclically or aperiodically.

7. The method as claimed in claim 6, wherein:
a time interval between two heatings of the medium following one after the other is so selected that within the time interval thermal equilibrium between at least the first and second temperature sensor elements and the medium essentially returns.

8. The method as claimed in claim 1, wherein:
at least one of the following additional steps are performed for ascertaining the flow rate and/or flow velocity of the medium:
determining, in each case, a thermal power output to the first, and the second, temperature sensor element through the medium;
normalizing the two temperature increases, especially by dividing the temperature increase by the output thermal power or its inverses and then forming a difference between the two normalized temperature increases;
linearizing a difference between the two normalized temperature increases by dividing by a function that contains the normalized temperature increases or their inverses;
ascertaining the flow rate and/or flow velocity by multiplying the linearized difference between the two normalized temperature increases or their inverses by a calibration factor; and
correcting the ascertained flow rate or flow velocity via a lookup table.

9. The method as claimed in claim 1, wherein:
the heating element is operated with a duty cycle of no greater than 10%, preferably no greater than 5%, in order to limit thermal power input to the medium.

10. The method as claimed in claim 9, wherein:
the average thermal power input into the medium is no greater than 2 mW, especially no greater than 1 mW.

11. An apparatus for determining a flow rate and/or a flow velocity of a medium, comprising:
a structure; and
a computing unit, wherein:
said structure is in thermal interaction with the medium and includes at least a first temperature sensor element, a second temperature sensor element and a heating element; and said computing unit is embodied to perform a method comprising the steps of:

heating the medium by means of the heating element for a predetermined heating duration, wherein the medium before the heating is largely in thermal equilibrium with at least the first and second temperature sensor elements; registering at least a first and a second measured value with the assistance of the first temperature sensor element and at least a third and a fourth measured value with the assistance of the second temperature sensor element for characterizing first and second temperature rises of the medium; and ascertaining the flow rate and/or flow velocity of the medium based on the at least two temperature rises;

wherein:

for characterizing the two temperature rises, for the registered first temperature rise a first constant and a first slope value are ascertained and for the second temperature rise a second constant and a second slope value are ascertained;

via the two constants, in each case, ohmic resistance values for the particular temperature sensor elements in thermal equilibrium are ascertained and via the two slope values, in each case, temperature increases for the particular temperature sensor elements are ascertained; and the determining of constants and slope values is performed after a transforming of the time values for linearizing the temperature rises.

12. The apparatus as claimed in claim 11, wherein:

said heating element is integrated in at least one of said two temperature sensor elements.

13. The apparatus as claimed in claim 11, wherein:

said heating element is embodied separately from said first and the second temperature sensor elements and is arranged between said two temperature sensor elements.

14. The apparatus as claimed in claim 11, wherein:

said structure, which includes said first and said second temperature sensor elements and said heating element, is embodied on a substrate and has an area of less than one square millimeter.

15. The apparatus as claimed in claim 11, wherein:

said structure comprises a micro structured, electrically conductive layer and said first temperature sensor element comprises a first ohmic resistor and said second temperature sensor element comprises a second ohmic resistor;

said resistors have a tolerance value of up to 10%, especially up to 20%; and the resistance values of said resistors can differ from one another by the tolerance value.

* * * * *